United States Patent Office 3,518,674
Patented June 30, 1970

3,518,674
MOBILE UNIT LOCATING SYSTEM
Donovan L. Moorehead, Reno, Nev., and Dan W. Patterson, Red Bank, N.J., assignors to Urban Scientific Corp., a corporation of New York
Filed Feb. 13, 1969, Ser. No. 798,968
Int. Cl. G01s 5/06
U.S. Cl. 343—112
10 Claims

ABSTRACT OF THE DISCLOSURE

A system for locating mobile units in a surveillance area where the mobile unit periodically transmits a pulse signal and plural receivers at mutually-spaced known locations receive the pulse signals and relay pulses based thereon to a computer means either by wire or by radio paths, different delays of known magnitudes being introduced into the relay paths so as to stagger the reception of pulses at the computer means in such a way that the pulses arriving from the different receivers always arrive in a prescribed sequence and never overlap each other, the computer means thus identifying the various receivers, and further including means for compensating out the known delays and then computing the mobile unit location by hyperbolic techniques. The system includes special interface circuitry for accomplishing these functions.

DISCLOSURE

Figure 1:
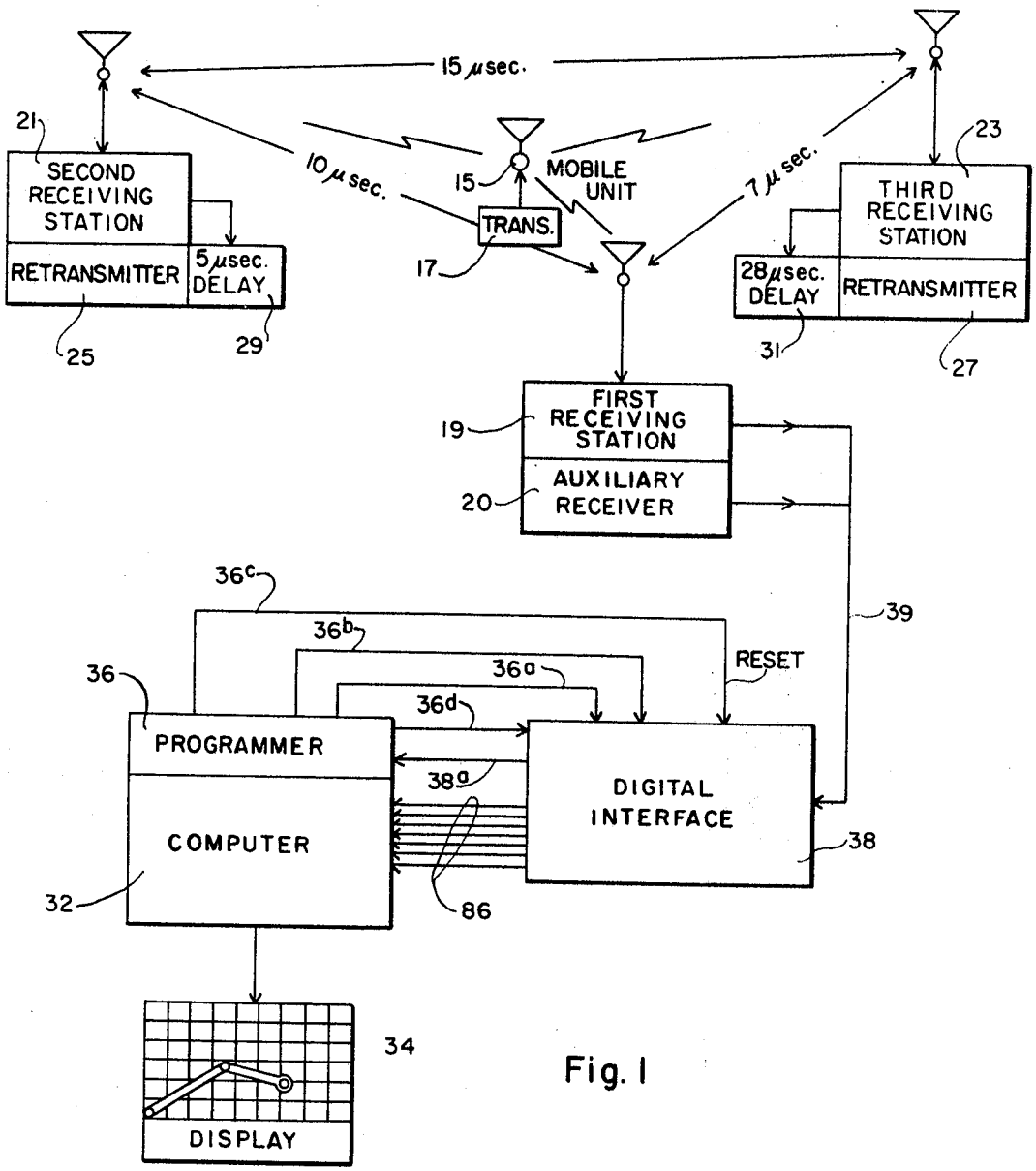

This invention relates to an improved system for locating mobile units within a surveillance area by receiving their periodic pulse signal transmissions at plural receiving stations and using a computer to solve hyperbolic relationships based upon known locations of the receiving stations and upon the times of arrival of said mobile unit signals thereat, and more particularly relates to novel means for introducing unique time delays to assist the computer in recognizing the various receiving stations sending pulses to the computer by the sequence in which such pulses arrive, regardless of the position of the mobile transmitting unit within the surveillance area, the system further including improved means for processing these signals at interface means interposed between the receiving stations and the computer.

There are a number of prior art systems using the relative times of arrival of signals at fixed receiving stations to locate vehicles in the vicinity by solving hyperbolic relationships. A typical one is shown in Bissett 2,940,076 in which travel times of the received signals to the computer are made equal by placing the computer an equal distance from each of the stations and feeding the signals into the computer along separate relay paths. Pat. 3,047,-861 to Arnold goes a step further by teaching that where the receiving stations are located at different distances from the computer and joined thereto by separate relay paths, delay lines should be introduced into the paths to insert complementary time delays to compensate for inequalities in distances from the various receiving stations to the computer site, thereby making the apparent path lengths equal so that the only time variations will be the result of differences in range from the mobile unit to the respective receiver stations. In both patents the signals arrive at the computer from the receivers along separate paths so that the receiver through which each signal was received is clearly identified by the path along which its output is relayed to the computer. This way of identifying the receiver relaying each signal is operational only where the receivers are joined to the computer by separate wires, or by radio relay links using different frequencies.

It is a major object of this invention to provide a system in which multiple receivers are linked to supply time-of-arrival data in the form of pulses to a computer via paths of various lengths and in which additional delays are selectively introduced into various paths in order to deliberately stagger the moments when the relayed pulses will arrive at the computer so that, regardless of the location of the mobile unit within the surveillance area, the various receivers will always report to the computer in the same fixed sequence in real time, whereby each receiver's contribution can be identified by its position within the sequence of related signal pulses. The computer means then compensates out the delays in the relay paths, which delays are always constant for each data path, and thereby obtains relative times of arrival from which the position of the mobile unit can be obtained. In the illustrative embodiment the obtained time-of-arrival data is in the form of differences in travel time of the signal from the mobile unit to the various receiving stations, and the computation of location of the mobile unit is performed in a manner resembling the computing technique used in Bissett Pat. 2,940,076 as described in column 3 et seq. These delays establish pulse arrival sequences which permit a single radio frequency to be used by all receivers in reporting times of arrival to the computer because no two receivers report at the same time. Moreover, it is convenient, but not mandatory, that the retransmissions from the receiving stations to the computer means be made at a different frequency than the mobile unit signal transmissions. However, if retransmissions must be made at the same frequency as the mobile units employ in their transmissions, the receivers should be gated off for a while after the reception of each vehicle's transmission, i.e. for a period long enough to prevent each receiver station from receiving one of the retransmissions from another station. This technique is also useful in eliminating multi-path signal reception, i.e. by gating off each receiver for a fixed interval after reception of the direct-path signal from a remote unit.

Another major object of the invention is to provide a novel interface system for receiving the aforementioned sequence of pulses from the various receivers and for converting and temporarily storing data in parallel binary form for delivery into the computer. Since the delays between the receivers and the computer means are all fixed and known, they can be stored by the computer means and subtracted from the arrival times of the pulses from said receiver stations in order to determine the relative times of arrival of the pulse signals from the vehicle at the various receiving stations. Alternatively, the counters in the interface can be programmed to automatically eliminate these known delays when storing the times of arrival thereat.

Another object of this invention is to provide a multiple receiving station system relaying data to a cooperative interface and computer through delay means in such a way as to eliminate the need for precision highly-stable time clocks anywhere in the system, and/or the need for synchronization of clocks at remote receiving stations.

Figure 2:
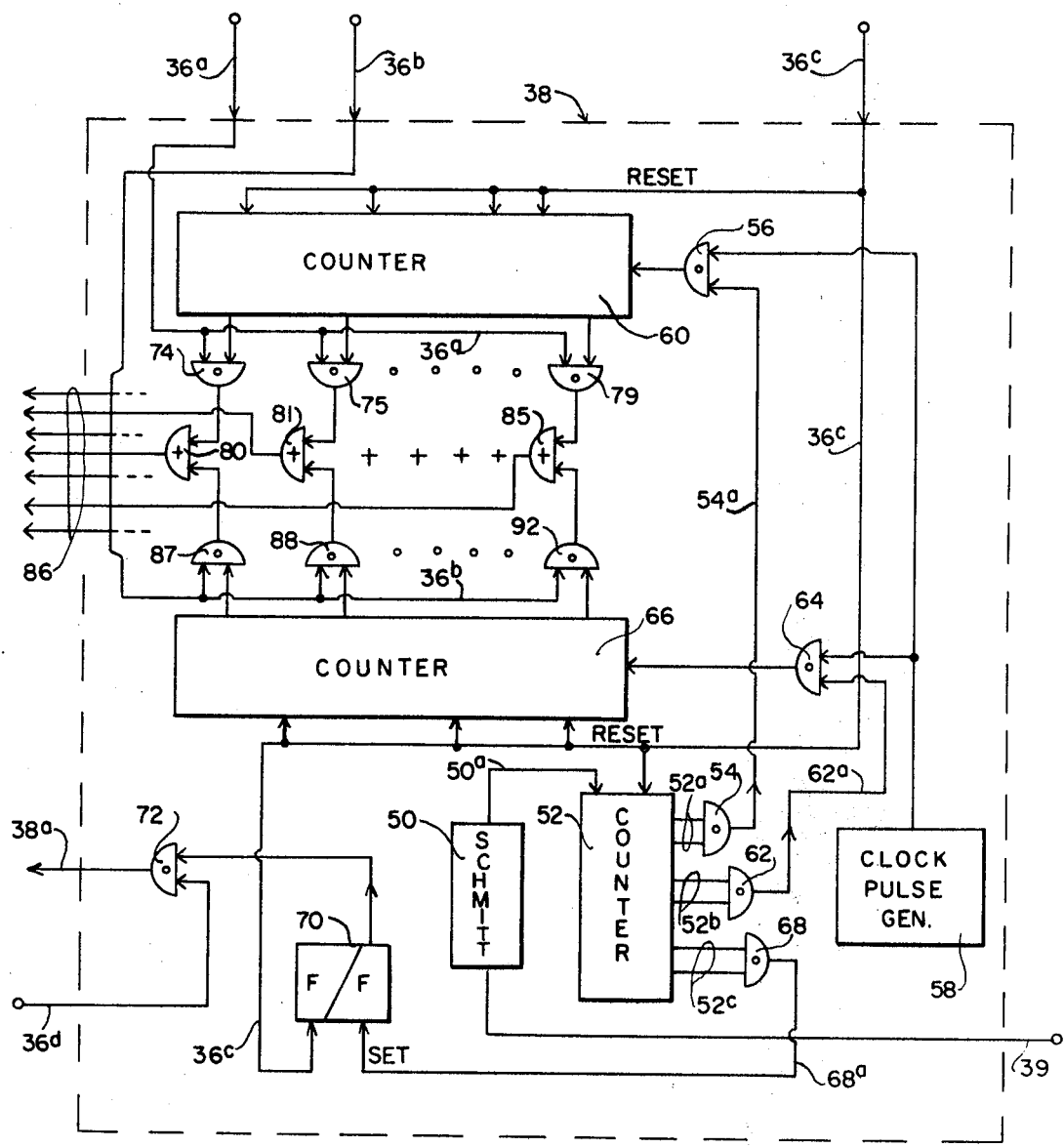

Other objects and advantages of the invention will become apparent during the following discussion of the drawings, wherein:

FIG. 1 is a diagram showing an embodiment of the invention including three receiving stations and a mobile unit periodically transmitting pulse signals marking its position in space with respect thereto, one of the receiving stations housing computer means; and FIG. 2 is a block diagram showing a novel interface for receiving pulse information from the three stations and converting it into digital data suitable for use by the computer.

Referring now to the drawings, FIG. 1 shows a mobile unit 15 which may comprise a ship, a land vehicle, or an aircraft, etc., the mobile unit including periodic transmitter means 17 for transmitting a suitable pulse signal at spaced intervals, the pulse signal being picked up by the three receiving stations respectively bearing the reference characters 19, 21 and 23. These receiving stations have suitable antennas of the omnidirectional type, and two of the receiving stations include means for replaying pulses to the first receiving station 19 in response to pulse signals received from the mobile unit 15. In the embodiment illustrated in FIG. 1 the retransmitting means comprise transmitters 25 and 27 connected to the antennas used by the receiving means 21 and 23, these transmitters being actuated through delay means 29 and 31 each of which provides a different degree of delay as will be discussed hereinafter. The first receiving station 19 preferably includes an auxiliary receiver 20 tuned to receive these retransmissions from the other two stations. The retransmitters 25 and 27 preferably operate on a different frequency than the transmitter in the mobile unit 15, although in other workable embodiments telephone lines could be used, or transmitters could be used employing the same frequency as the mobile unit 15. The use of a different retransmitting frequency is helpful since it avoids the likelihood that one receiving station will pick up a retransmission from another receiving station and mistake it for a transmission from a mobile unit. Another way of avoiding this difficulty is to use coded pulse groups so that the mobile unit signals are distinctive, for instance comprising a certain number of pulses having characteristic spacings to uniquely identify them as mobile unit transmissions. Moreover the retransmitters in the various receiving stations could then use different pulse-coded groups to identify their specific character and purpose.

The system shown in FIG. 1 also comprises computer means including a computer 32, driving a display device 34 of suitable character to indicate the location of the mobile unit within the surveillance area. The computer 32 also has a programming means 36 associated with it, this programming means serving the purpose to be hereinafter described in detail. The computer means and display can either be in a location remote from any of the receiving stations, or alternatively the computer means can be situated in one of the receiving stations. Either system is workable, but the present embodiment places the computer at the first receiving station 19 and couples it to this receiving station through a digital interface 38 which also comprises part of the computer means and serves to convert serially received signals from the various receiving stations into stored digital data accessible to the computer. The digital interface 38 will be described in greater detail in connection with FIG. 2.

For the purposes of describing FIG. 1, is is sufficient to say that the interface 38 receives pulse groups arriving from the first station 19 on wire 39 and comprising a series of three sequential pulses, or coded pulse groups, having certain elapsed-time spacings therebetween. The digital interface measures the spacings between any two sequential pairs of these pulses, in the present illustration between the first and second pulses and between the second and third pulse and stores these spacings in two counters as binary numbers. When it has completed this function it sends an enabling signal on the wire 38a to the programmer 36 which then sequentially samples the stored time differentials, first issuing a sampling signal on wire 36a to sample the first stored interval and then issuing another sampling signal on wire 36b to sample the second stored interval. When both intervals have been sampled by the computer, the programmer then sends out a clear signal on wire 36c which resets the digital interface and makes it ready to receive the next group of signals representing the location of a different vehicle, all as described below in connection with FIG. 2.

Each time the vehicle transmits its pulse signal, the pulse travels to the various receiving stations 19, 21, and 23 and arrives at each after the propagation time necessary for it to travel there from the vehicle. If all three receiving stations are identical, they will each introduce a system delay amounting to a few microseconds, and these delays will be equal among the three stations and constant. However, according to the present invention the receiving stations then retransmit pulses to the computer through the digital interface 38, but these retransmitted pulses are further delayed by different amounts in each of the receiving stations so that their pulses always arrive at the interface 38 in time-spaced sequence. Thus, the receiving station provides an additional arbitrarily determined delay after reception of the vehicle pulse signal, and at the end of that delay it retransmits a sharp-rise-time pulse to the central computer means.

The amount of delay to be introduced at each receiving station before retransmitting a pulse to the computer means is determined such that the signals arriving from the various receiving stations at the computer means will be in a specific order so that the computer can identify the receiving station from which the pulse was retransmitted and therefore can correlate each received pulse with that particular receiving station from which it was retransmitted.

In the illustrative example shown in FIG. 1 it is assumed that the computer means will be located substantially at the first receiving station 19 and that the other two receiving stations 21 and 23 will retransmit their information to the first receiving station 19 which will then pass it on to the computer means via wire 39. Obviously it is not necessary that the computer means be located right at any of the stations, but it is convenient to do so. Since all signals arriving through any receiving station according to the present embodiment always pass through the first receiving station, all signals will be delayed by the amount of system delay existing in the first receiving station and the circuitry connecting the latter to the computer means and including the digital interface circuitry. Therefore, there is no point in introducing any further delay after the first receiving station 19 and prior to the digital interface 38, since such a delay would act upon all of the signals received from any source. Therefore, it will be assumed that the first signals in any group of related signals to reach the digital interface 38 will correspond with the pulse signal transmitted by the mobile unit 15 directly to the first receiving station 19. Moreover, the introduction of deliberate delay means 29 and 31 in the other two stations will be selected such as to insure that the first signal to reach the digital interface 38 always comes from the first receiving station 19. Thus, the time of arrival of a pulse signal from the mobile unit 15 at the digital interface 38 will be later than the moment of transmission by the vehicle transmitter 17 by the delay occasioned by propagation of the pulse signal from the mobile unit to the receiving station, plus the inherent system delay of the receiver in station 19 and the transmission line 39 to the digital interface 38.

In selecting a suitable delay to be introduced by the delay means 29 at the second receiving station, it is desirable to make this selection in such a way that the pulse arriving through the second receiving station will be in every case deposited in the digital interface 38 at a time later than the pulse deposited directly from the first receiving station, plus a safe margin. For illustrative purposes assume that the second receiving station 21 is 10 microseconds distant from the first receiving station 19 for pulses retransmitted by the transmitter 25 to the receiver 20. Then it follows that by adding five microseconds delay in the delay unit 29, the pulse arriving through the retransmitter 25 at the receiver 20 will never precede the pulse arriving directly from the mobile unit at the first receiving station 19. The difference in arrival time of the pulse retransmitted through the second receiving station 21 as compared with the direct arrival time of a mobile unit signal at the first receiving station can be anything from 5 to 25 microseconds, depending upon the location of the mobile unit with respect to both stations. This follows from the fact that if the mobile unit is at the second station 21, the travel time of its pulse signal to the first station 19 is equal to the travel time of the retransmitted pulse from the second receiving station to the first station 19, omitting the delay 29. Thus, a five microsecond delay by the circuit 29 will place the retransmitted pulse always later than the direct pulse, as measured at the first station 19. Conversely if the mobile unit is at the first station 19, there will be substantially no delay to it, but there will be a 25 microsecond delay where the pulse signal travels to the second station and is then retransmitted to the first through the delay circuit 29. In any event, regardless of the position of the vehicle, there will always be at least a five microsecond margin by which the pulse arriving through the retransmitter 25 must lag the pulse arriving directly from the vehicle at the first receiving station 19.

In connection with the third receiving station, its delay 31 must be selected such that the retransmitted pulse arriving via the transmitter 27 in the third station 23 at the first receiving station 19 will arrive later by a margin of at least 5 microseconds than any pulse arriving from the second receiving station 21 so that no pulse arriving from the third receiving station can ever overlap a pulse arriving from the second receiving station. The selection of the delay in the third station will depend upon the amount of delay selected for the second receiving station, and upon the difference in distance between the second and third receiving stations as measured from the first receiving station. However, the smallest satisfactory delay should be selected so as not to waste time which is being shared by other vehicles.

To proceed with a numerical example, suppose that the second receiving station is 15 microseconds away from the second receiving station and 7 microseconds away from the first receiving station. Thus, the mobile unit 15 could be so located that its pulse signal could arrive at the second receiving station a full 15 microseconds after it arrives at the third receiving station. Therefore, since it would be another 15 microseconds before the pulse passes through the second receiving station and thence to the first, the total delay associated with the third receiving station should be something greater than 30 microseconds, for instance 35 microseconds to provide a 5 microsecond margin. In view of the fact that the propagation delay from the third receiving station to the first receiving station is 7 microseconds, then the delay introduced at the third receiving station 23 by the delay circuit 31 should be 28 microseconds. In other words a 28 microsecond delay introduced by the circuit 31 plus the 7 microsecond delay caused by the propagation time from the third receiving station to the first receiving station would provide a total delay from the third receiving station of 35 microseconds.

Since the deliberate delays incorporated into the various stations are constant, and since the propagation delays between stations and the small system delays inherent in the various stations are constant, these fixed delays can be compensated out at the computer means to recover only the differentials in the arrival times of the pulse signals due to the differences in ranges as measured from the mobile unit to the various receiving stations, as will be presently discussed.

In a hyperbolic system used to locate a mobile unit with respect to various receiving stations, the absolute time of arrival at the three receiving stations is unimportant, since the real factor of interest is the difference in times of arrival. The digital interface 38, shown in detail in FIG. 2, is a logic system adapted to accept three time-spaced pulses arriving serially from the three receiving stations and including in their separations the introduced delays, and then to determine the differences in times of arrival of the pulses, there being two differences in times of arrival among the three stations required to define the sequence of three events. The digital interface 38 receives the three pulse events, measures the time differences therebetween and stores these differences in counters which provide digital outputs useful to the computer 22. In the present embodiment only two counters are used, although three or more counters can be used if desired in different embodiments, having for example more receiving stations. When the digital interface has completed the determination of the time differentials and stored them, it then delivers a pulse on the wire 38a to enable the computer programmer 36 to commence operation. The programmer 36 delivers a sampling signal on wire 36a which causes the digital interface to read out the first time difference which it has stored, and then the programmer 36 puts out a sampling signal on wire 36b causing the digital interface to read out the second stored time. When the computer has accessed both stored times, the programmer puts out a reset signal on wire 36c which resets the digital interface and thereby enables it to begin accumulating and storing the time differences for pulse signals arriving from the next mobile unit to transmit for the purposes of determining its location with respect to the three receiving stations.

Referring to FIG. 2, the digital interface 38 receives the three pulse signals through the first receiving station 19 and the receiver 20 via the wire 39, and these signals pass one at a time through a Schmitt trigger 50 which squares them to provide uniform operation of the digital interface circuitry. These pulses pass into a counter 52 having four states, the fourth of which is a reset state. The first pulse coming from the Schmitt trigger counts the counter 52 from reset to the first state to provide an output representing its binary first count. This output appears on the wires 52a and enables the AND gate 54 to provide an output on the wire 54a and thereby enable the AND gate 56. A clock oscillator 58 supplies pulses at a predetermined rate, and these pulses then pass through the AND gate 56 and begin counting the counter 60 upwardly. The counter then accumulates pulses from the clock oscillator 58 substantially continuously as long as the AND gate 56 is enabled.

However upon receipt of the second of the three pulses arriving on wire 39, the Schmitt trigger 50 delivers a second pulse on the wire 50a and changes the counter 52 to its second state, thereby disabling the AND gates 54 and 56, and enabling the AND gate 62 through the wires 52b. Thus, the counter 60 stops accumulating pulses and retains its count. The output of the AND gate 62 on wire 62a enables the AND gate 64, which then begins passing pulses from the clock oscillator 58 to the counter 66. This counter is counted upwardly continuously by pulses coming through the AND gate 64 as long as this AND gate is enabled.

Now, the arrival of the third pulse on wire 39 causes the Schmitt trigger 50 to put out another signal on wire 50a which changes the counter 52 to its third state, thereby disabling the AND gate 62 and the AND gate 64 to stop the flow of pulses into the counter 66, which then retains its count. In the third state of the counter 52, the wires 52c enable the AND gate 68 and provide an output on the wire 68a and set the flipflop 70 and enable one input to the AND gate 72. The computer programmer 36 periodically tests the digital interface to determine whether it is ready to deliver new pulse-position data. The test pulse is delivered through the wire 36d to the AND gate 72 which is blocked when the flipflop 70 is in reset condition. However, when the flipflop is set by an output from the AND gate 68, the AND gate 72 is enabled, the next test pulse arriving from the computer on the wire 36d passes through the AND gate 72 and provides an output on wire 38a to actuate the computer to access the interface. In response to the output on wire 38a, the computer first delivers a sampling signal on the wire 36a which enables a row of AND gates 74, 75 . . . 79, which gates then read out the various stages of the counter 60 into a series of OR gates 80, 81 . . . 85, whose individual outputs on wires 86 are delivered to the computer as binary numbers indicating the count contained within the counter 60 and representing the difference in time of arrival of the mobile unit pulse arriving directly at the first receiving station and the retransmitted pulse relayed from the second receiving station.

The sampling signal on wire 36a then disappears, and a sampling signal appears on wire 36b from the programmer 36 to enable the gates 87, 88 . . . 92, which then read out the various stages of the counter 66 into the OR gates 80, 81 . . . 85 to provide outputs on wires 86 to the computer representing as binary numbers the difference in time between the arrival of the second pulse at the digital interface 38 and the arrival of the third pulse thereat. When this information has been obtained, the computer programmer 36 sends back a clear signal on wire 36c which resets the counters 52, 60 and 66 to their initial states, and also resets the flipflop 70 to thereby remove the enabling signal from the gate 72. The computer then goes on sending out test pulses via the wire 36d to test whether or not the AND gate 72 is enabled by the flipflop 70. When the digital interface has acquired the next date concerning location of a mobile unit, it will so signify by setting the flip-flop 70 and permitting the test pulse from the computer on the wire 36d to pass through the gate 72 onto the wire 38a and thereby enable the programmer 36 to read into the computer 32 the information stored in the digital interface.

As mentioned above, the computer can be programmed to subtract the known delays associated with the second and third receiving and retransmitting stations, and then process the time difference data taken from the digital interface accordingly to determine locations of mobile units. The computer and display used in the working embodiment of this invention are commercially available items and include a Control Data PDP-8 computer driving a Calcomp digital X-Y plotter. The computing process need not be further discussed herein, since the problem has been well covered in the prior art, for instance in Bissett Pat. 2,940,076, mentioned above.

Alternatively, the compensating out of the fixed and known delays associated with the second and third receiving stations' pulses can be easily accomplished in the interface 38, instead of in the computer as mentioned in the last paragraph. For example, instead of resetting the counters 60 and 66 to zero, reset them to read a count representing complements of the delays so that the delays disappear in the counting process. It should be pointed out that in the present embodiment the counter 60 registers the elapsed time between the arrival of the first and second pulses, and the counter 66 registers the elapsed time between the arrival of the second and third pulses at the interface 38. By changing the gating slightly, the counter 66 could be made to register the elapsed time between the arrival of the first and third pulses instead. Other combinations are also possible.

The present system is operative regardless of whether or not any time-sharing means is employed to cause the various mobile units to transmit their pulse signals at mutually noninterferring moments. The incorporation of such a time sharing system may be desirable in an area of high density traffic, although it is certainly not necessary in a low density situation. The computer can be programmed to reject data which has more than three pulses in succession, and which would thereby indicate interference from another vehicle, or some other type of ambiguity. By using such a rejection system, plus providing a certain amount of jitter in the repetition rate of the mobile unit pulse signals a random system can be employed which will be successful under ordinary circumstances.

Having described a working embodiment of the present invention, we now present the following claims.

We claim:
1. In a system for locating within an area mobile units which periorically transmit pulse signals, comprsing:
   (a) at least three pulse-signal receiving stations at known locations mutually spaced apart within said area;
   (b) computer means for determining the position in said area of a mobile unit whose pulse signals are received at said stations based upon the relative times of arrival of said signals thereat;
   (c) communication means for relaying pulses corresponding to received signals from said receiving stations to said computer means;
   (d) means associated with the receiving stations and their communication means for introducing different fixed delays between the times of reception of mobile unit signals at said stations and the times at which pulses corresponding with the receptions of these signals are communicated to the computer means, the various fixed delays being such that regardless of the location of the mobile unit in said area the pulse relayed to the computer means by the first station always arrives thereat before the related pulse relayed by the second station, and the latter pulse always arrives at the computer means before the related pulse relayed by the third station.

2. In a system as set forth in claim 1, said computer means including means for compensating out from the differential times of arrival of said pulses thereat the delays introduced by said delay means to restore their relative times of reception at the receiving stations.

3. In a system as set forth in claim 1, said computer means being located at the first receiving station, which station delivers pulses representing received signals directly to it; and the other receiving stations including means for receiving said signals, means for relaying pulses to the computer means in response to received signals, and delay means for connecting the receiving means to actuate the relaying means.

4. In a system as set forth in claim 3, said means for relaying a pulse from said other receiving stations each comprising pulse retransmitting means connected to be actuated by the associated delay means; and the receiving means at the first receiving station including means to receive the retransmitted pulses from said other stations.

5. In a system as set forth in claim 4, said retransmitting means and said means to receive retransmitted pulses being tuned to a frequency different from the frequency of the pulse signals transmitted by said mobile units.

6. In a system as set forth in claim 1, the delay means at the respective receiving stations introducing graduated delays such that, when combined with the delays inherent in the associated relaying means, each delayed pulse which corresponds with the reception of a signal from a mobile unit located within said area will arrive at the computer means within an interval of possible arrival times which is unique to that receiving station and exclusive of possible pulse arrival times from other receiving stations actuated by the same mobile-unit signal.

7. In a system as set forth in claim 6, said computer means including means for compensating out from the differential times of arrival of said pulses thereat the delays introduced by said delay means combined with the dealys inherent in the associated realying means.

8. In a system as set forth in claim 1, said computer means comprising a digital computer and further including interface means connected to receive said pulses corresponding with received mobile unit signals and sequentially arriving at said interface means, and the interface means including means for generating and delivering to the computer digital outputs representing time differentials between arrivals of related pulses.

9. In a system as set forth in claim 8, the pulses corresponding with received mobile-unit signals arriving one at a time in a sequence determined by the magnitudes of said fixed delays plus the delays inherent in the associated relaying means, and said interface means including a source of clock pulses, plural counter means, gate means in control of admission of said pulses selectively to count up said counter means, and means for enabling different ones of said gate means in response to successively receive pulses to count up associated counter means during time intervals between pulses.

10. In a system as set forth in claim 9, means in the interface means for providing an indication when its counter means has accumulated counts representng times of arrival of a pulse signal at all of the receiving stations; means in the computer responsive to such indication for sampling said conter means, and further including means responsive to completion of said samplings for resetting said counter means and said indication means.

References Cited

UNITED STATES PATENTS

| | | | |
|---|---|---|---|
| 2,428,966 | 10/1947 | Gage | 343—112 X |
| 3,047,861 | 7/1962 | Arnold et al. | |
| 3,060,426 | 10/1962 | Wlliams. | |

RODNEY D. BENNETT, Jr., Primary Examiner

R. E. BERGER, Assistant Examiner